United States Patent [19]
Benson et al.

[11] Patent Number: 5,542,076
[45] Date of Patent: Jul. 30, 1996

[54] METHOD AND APPARATUS FOR ADAPTIVE INTERRUPT SERVICING IN DATA PROCESSING SYSTEM

[75] Inventors: David Benson, Acton; Paul W. Ciarfella, Arlington, both of Mass.; Peter C. Hayden, Mont Vernon, N.H.; David S. Sawyer, Merrimac, Mass.

[73] Assignee: Digital Equipment Corporation, Maynard, Mass.

[21] Appl. No.: 65,515

[22] Filed: May 20, 1993

Related U.S. Application Data

[63] Continuation of Ser. No. 715,160, Jun. 14, 1991, abandoned.

[51] Int. Cl.$^6$ .............................. G06F 9/46; G06F 13/14
[52] U.S. Cl. ...................... 395/733; 395/734; 395/736; 395/742
[58] Field of Search ................................. 395/275, 325, 395/725, 775, 250, 425, 500, 427–497.04, 280–312, 726–742, 821–894; 377/15; 364/134; 340/825.06

[56] References Cited

U.S. PATENT DOCUMENTS

| | | | |
|---|---|---|---|
| 3,627,995 | 12/1971 | Warner, Jr. et al. | 377/15 |
| 4,031,517 | 6/1977 | Hirtle | 395/500 |
| 4,099,255 | 7/1978 | Stanley et al. | 395/725 |
| 4,173,737 | 11/1979 | Skerlos et al. | 325/418 |
| 4,218,739 | 8/1980 | Migi et al. | 395/725 |
| 4,325,119 | 4/1982 | Grandmaison et al. | 395/375 |
| 4,348,725 | 9/1982 | Farrell et al. | 364/200 |
| 4,393,470 | 7/1983 | Miard | 395/775 |
| 4,456,970 | 6/1984 | Catiller et al. | 395/275 |
| 4,470,111 | 9/1984 | Jenkins et al. | 395/725 |
| 4,644,462 | 2/1987 | Matsubara et al. | 395/725 |
| 4,648,029 | 3/1987 | Cooper et al. | 395/325 |
| 4,709,324 | 11/1987 | Kloker | 395/725 |
| 4,716,523 | 12/1987 | Burrus et al. | 364/200 |
| 4,734,882 | 3/1988 | Romagosa | 395/725 |
| 4,751,834 | 6/1988 | Burrus et al. | 364/200 |
| 4,799,148 | 1/1989 | Nishioka | 395/725 |
| 4,831,518 | 5/1989 | Yu et al. | 364/200 |
| 4,837,677 | 6/1989 | Burrus et al. | 364/200 |
| 4,839,800 | 6/1989 | Barlow et al. | 364/200 |
| 4,907,149 | 3/1990 | Gula et al. | 395/725 |
| 4,922,416 | 5/1990 | Krishnan et al. | 395/275 |
| 4,953,072 | 8/1990 | Williams | 395/725 |
| 4,967,342 | 10/1990 | Lent et al. | 395/725 |
| 4,980,820 | 12/1990 | Youngblood | 395/725 |
| 5,036,458 | 7/1991 | Matsushima et al. | 395/725 |
| 5,038,274 | 8/1991 | Nielsen | 395/325 |
| 5,101,478 | 3/1992 | Fu et al. | 395/275 |
| 5,117,498 | 5/1992 | Miller et al. | 395/775 |
| 5,166,872 | 11/1992 | Weaver et al. | 395/200 |
| 5,179,704 | 1/1993 | Jibbe et al. | 395/725 |
| 5,223,827 | 6/1993 | Bell et al. | 340/825.06 |
| 5,295,246 | 3/1994 | Bischoff et al. | 395/250 |
| 5,394,527 | 2/1995 | Fakhruddin et al. | 395/275 |

Primary Examiner—David K. Moore
Assistant Examiner—Tariq Rafiq Hafiz
Attorney, Agent, or Firm—Christine M. Kuta; Kenneth F. Kozik

[57] ABSTRACT

A method and apparatus for adaptive interrupt servicing is disclosed. The number of interrupts occurring within a predetermined time period is counted and stored as a value in an interrupt counter. At the end of each interrupt service, the interrupt counter value is compared to a predefined threshold value. If the value in the interrupt counter equals or exceeds the threshold value, further interrupt servicing is disabled.

4 Claims, 4 Drawing Sheets

METHOD AND APPARATUS FOR ADAPTIVE INTERRUPT SERVICING IN DATA PROCESSING SYSTEM

This application is a continuation of application Ser. No. 07/715,160, filed Jun. 14, 1991 now abandoned.

FIELD OF THE INVENTION

The invention relates to data processing systems, and more particularly, to apparatus and methods for adaptively servicing interrupts received by a computer or other controlling device.

BACKGROUND OF THE INVENTION

Traditional computer systems employ two main techniques to detect and respond to external events affecting the system, namely "polling" and "interrupt based".

The first technique, known as "polling", relies on the use of a controller in the form of a processor or a dedicated computer which checks for the occurrence of all possible events in the data processing system. Typical events are service requests, transmission and reception of data, error reports, and device status checks. The occurrence of a service request event, for example, indicates that one of the various devices in the data processing system requires that a certain operation be performed by the controller. The requesting device produces a request signal at its request status output port. The controller checks for the presence of a request signal at the request status output port of each device periodically to determine if any requests have been made and processes them as they occur.

Polling for device status may be used whenever the controller seeks to determine availability of some of a group of devices, such as data memory devices, to process its request. For example, the controller may require that data be stored in any one of several memory devices. Each memory device produces a signal indicating its availability. The controller polls the memory devices in the data processing system to determine which one is available for the operation. Once the controller detects that a memory device is available, by polling the device's request status output port, data transfer between the controller and the memory device is performed.

The frequency with which such polling is repeated, or the polling rate, can be selected to establish an acceptable balance between promptness of event detection and excessive consumption of the controller's time. A rapid polling rate results in timely detection of events, but at a cost of excessive consumption of controller time since the controller must spend time to frequently check for events which may not have occurred. A slower polling rate, on the other hand, decreases the promptness with which events will be detected, but offers the advantage of a corresponding reduction in the overhead of polling for a large number of possible events.

The second technique, known as "interrupt based", forces each external event to seek controller acknowledgment directly. This mode of controller operation is commonly referred to as interrupt because the controller interrupts the task it is currently performing to respond to the external event. Each device in the data processing system has access to the controller by being connected to one of the controller's interrupt ports. Upon the occurrence of an event, the device requests a desired operation from the controller by producing an interrupt signal which is supplied to the controller's interrupt port. In response to the interrupt signal the controller suspends its current activity and services the interrupt immediately. The interrupt service typically consists of executing an interrupt routine which is stored in known memory locations accessible to the controller. The controller is able to associate an interrupt signal arriving at a specific interrupt port with the memory address of a corresponding interrupt routine. This is usually accomplished by storing the initial address of the interrupt routine, known as a vector, in a reserved memory location, which is read by the controller upon the detection of the respective interrupt signal. In a data processing system where multiple interrupts representing occurrences of multiple events are likely to occur, interrupt prioritization is often established so that an interrupt will cause suspension of the system activity only if no higher priority interrupt is currently being processed.

This technique has the advantage that interrupts can be very quickly detected and serviced without the continuous overhead associated with a rapid polling rate. However, it also suffers from the disadvantage that the controller must be made capable of processing interrupts at their fastest rate of occurrence. If the controller cannot process interrupts at the fastest occurring rate, the controller time can be entirely expended on continuously processing interrupts, thereby preventing it from performing its other functions.

It is known to disable interrupts generated by certain events in the data processing system to ensure that the controller has sufficient time to perform critical system tasks such as device initialization and diagnostics. Once these operations are completed, the interrupts are reenabled and the data processing system resumes its operation.

One way to control interrupt handling is to provide an interrupt flag stored in a register inside the controller. The interrupt flag is set to one of the two predetermined values corresponding to the interrupt enabled and interrupt disabled conditions. To determine whether the specific interrupt is enabled or not, the controller checks the contents of the interrupt flag register.

It is also known to delay servicing interrupt requests for a fixed period of time to permit various devices in the data processing system to attain a required state, such as when initializing or preparing for communication with other system components. In such a system, a counter is set to count a predetermined number of clock pulses representing a corresponding period of time. During this period of time the interrupt service is disabled and the processing elements of the data processing systems, such as the controller, are able to attend to other tasks. Once the end of the time period is reached, the controller is again ready to process interrupts and the interrupt service is reenabled.

One variation on the interrupt method prevents rapidly occurring interrupts from using all of the controller's time under some circumstances. Using this method, the controller counts events occurring in a continuous sequence. The sequence of events is continuous if a new event occurs before the controller has completed processing the previous event. Once a prespecified threshold number of events in the continuous sequence, has been exceeded, the controller response to the interrupts caused by the events is disabled and a counter, set to count a clock signal, is started. When the value in the counter reaches a known threshold, corresponding to a predetermined time period, the interrupt is reenabled and subsequent servicing of interrupts can resume.

The above approaches ensure that the controller's time is not used exclusively to process interrupts caused by continuously occurring events. However, the controller is still vulnerable to events encountered singly (i.e. not in a continuous sequence) but with relatively high frequency, or in continuous groups (i.e. with each event in the continuous group occurring before the controller has completed processing the previous event in the group) numbering fewer than the prespecified threshold. Since the number of continuous events occurring successively never exceeds the threshold, the controller activity continues to be substantially dominated by interrupt servicing to the exclusion of other competing demands on the controller time.

A method of processing interrupts is desired which will not allow controller activity to be substantially dominated by interrupt servicing when interrupts occur frequently, but not continuously.

SUMMARY OF THE INVENTION

The invention is a method and apparatus for adaptively servicing interrupts in a data processing system.

A method, in accordance with principles of the present invention, includes the following steps. First, counting the number of interrupts which occur within the selected time period. Second, at the end of each interrupt service, comparing the number of interrupts counted to a predetermined threshold value. Third, if the number of interrupts equals or exceeds the threshold value, disabling interrupt servicing.

The apparatus, in accordance with the principles of the present invention, includes the following elements. First, means for selecting a time period. Second, means for counting the number of interrupts occurring within the selected time period. Third, means for comparing the number of interrupts with a predetermined threshold value at the end of each interrupt service. Last, means for disabling further interrupt servicing if the number of interrupts equals or exceeds the threshold value.

A more detailed understanding of the invention may be had from the following description of the preferred embodiments, given by way of example, to be read in conjunction with the accompanying drawings, wherein

DETAILED DESCRIPTION

Figure 1:
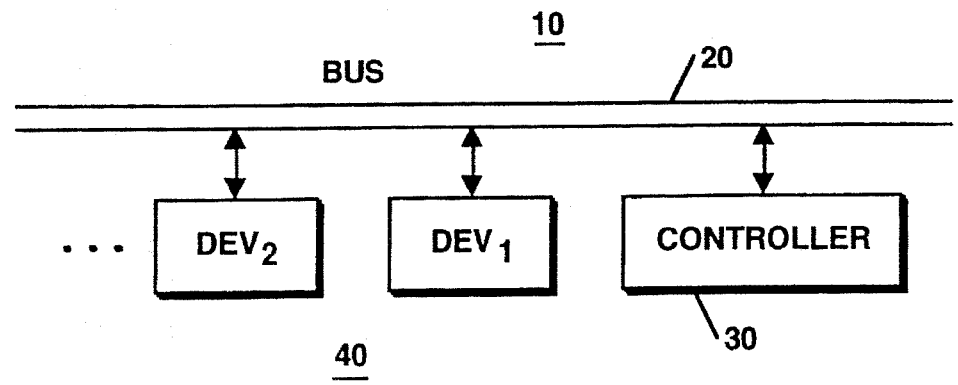
FIG. 1 is a block diagram illustrating the data processing system in accordance with the invention.

FIG. 1 is a block diagram illustrating a data processing system 10 which includes a common bus 20 coupling together the elements of data processing system 10 such as a controller 30, which is a dedicated processing element, such as a computer; and a plurality of ancillary devices 40. The ancillary devices may be any of a variety of communication interfaces, input-output (I/O) devices, memories, and other computers. Operations within data processing system 10, such as data transfers, device status checks, and various service requests, may require that devices 40 share the resources of controller 30. For example, controller 30 may be called upon to direct the data transfer over common bus 20 between two or more of the ancillary devices 40, such as computers, in the data processing system 10, in accordance with a known communication protocol. Data storage and retrieval operations involving I/O devices and one or more computers connected to common bus 20 also require intervention of controller 30 which follows an appropriate mass storage protocol. In addition, controller 30 checks the status of the various devices in data processing system 10 and is able to initiate diagnostic procedures and error recovery operations upon fault detection to provide reliable system operation.

Figure 2:
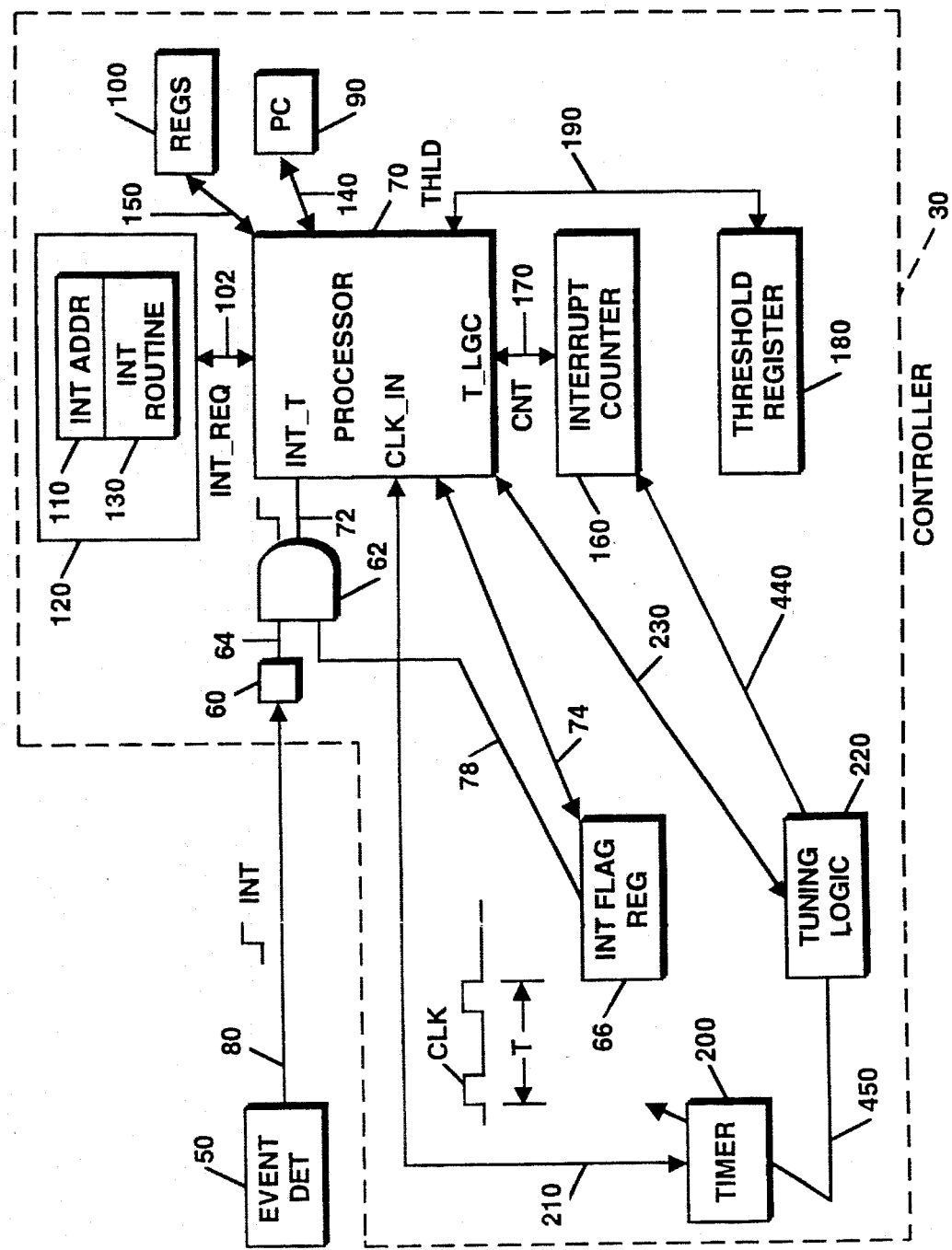
FIG. 2 is a block diagram illustrating the interrupt processing portion of the controller in FIG. 1.

FIG. 2 is a block diagram of controller 30. An output terminal of an event detector 50 is coupled to an interrupt port 60 of controller 30 by means of line 80. Controller 30 is represented in FIG. 2 by a dashed line enclosing all of its constituent elements. Interrupt port 60 is coupled to a first input terminal of an AND gate 62 via line 64. An output terminal of an interrupt flag register 66 is coupled to a second input terminal of AND gate 62 via line 78. An output terminal of AND gate 62 produces an interrupt request signal (designated as INT_REQ in FIG. 2) which is coupled via line 72 to an interrupt input terminal (INT_T) of a processor 70. Interrupt flag register 66 is coupled to processor 70 and is able to send signals to and receive signals from processor 70 via line 74. Processor 70 is also coupled to a program counter (PC) 90 and is able to exchange information with program counter 90 via line 140. Processor 70 is further coupled to registers (REGS) 100 via line 150, to an interrupt counter 160 via line 170, a timer 200 via line 210, and a threshold register 180 via line 190. A tuning logic 220 is coupled to a tuning logic input terminal (T_LGC) of processor 70 via line 230. Processor 70 is coupled to a memory 120 and is capable of accessing data stored in memory 120 via line 102. Among the memory locations inside memory 120 are an interrupt address location 110 and a series of locations containing an interrupt routine 130. Although drawn as contiguous areas in FIG. 2, one skilled in the art will understand that the location of interrupt routine 130 in memory 120 may be separated from the location of the interrupt address 110.

The arrowhead lines 440 and 450, initiating from tuning logic 220 and drawn across the blocks representing threshold register 180 and timer 200, respectively, indicate that tuning logic 220 is capable of changing the contents of threshold register 180 and modifying the characteristics of the output signal of timer 200.

In operation, when device activity results in an event, an interrupt signal INT is generated by event detector 50 and supplied to interrupt port 60 of controller 30. The output signal of interrupt port 60 is supplied to the first input terminal of AND gate 62. Interrupt flag register 66 provides an interrupt enable (INT_EN) signal to the second input terminal of AND gate 62 whose level is based upon the contents of interrupt flag register 66, as described below. The value in interrupt flag register 66 is set by processor 70 to one of the two interrupt states. A first interrupt state corresponds to interrupt processing being enabled. The other state corresponds to the interrupt processing being disabled, in which controller 30 ignores interrupt service requests.

Initially, the value in interrupt flag register 66 corresponds to the interrupt enabled state. Interrupt flag register 66 supplies a logic level 1 interrupt status signal such as an interrupt enable signal INT_EN to the second input terminal of AND gate 62 via line 78. When an interrupt signal INT is generated by event detector 50, AND gate 62 communicates an interrupt request signal (INT_REQ) via line 72 to processor 70.

The processing of further interrupts is disabled when a signal from processor 70 changes the contents of interrupt flag register 66 to a value representing the interrupt disabled state. This results in a corresponding level change in the interrupt enable signal INT_EN to logic level 0 at the second input terminal of AND gate 62. Processor 70 then suspends the execution of its current task by saving the necessary indicators of its state prior to the interrupt to designated locations in memory 120. These indicators include the contents of a program counter 90 and registers 100. Processor 70 then accesses interrupt address location 110 inside memory 120. Once the interrupt address is found, processor 70 proceeds to retrieve the interrupt service instructions stored in interrupt service locations 130, indicated by the interrupt address from memory 120, via line 102 and execute them.

Once the interrupt routine is completed, the processor's ability to respond to further interrupt signals generated by event detector 50 is reenabled by resetting the contents of the interrupt flag register 66 to correspond to the interrupt enabled state. The state of processor 70 which existed immediately prior to the occurrence of the interrupt is restored by retrieving the pre-interrupt values of program counter 90 and registers 100 from their storage locations in memory 120 and using these values to replace the contents of program counter 90 via line 140 and the contents of registers 100 via line 150. In addition, interrupt counter 160, coupled to processor 70 via line 170, is incremented by one.

The manner in which controller 30 handles subsequent interrupts produced by event detector 50 depends upon: the contents of interrupt counter 160; the contents of threshold register 180 and the time period T of a clock signal CLK, which is generated by timer 200 in the form of a square waveform on line 210, as described below.

Figure 3:
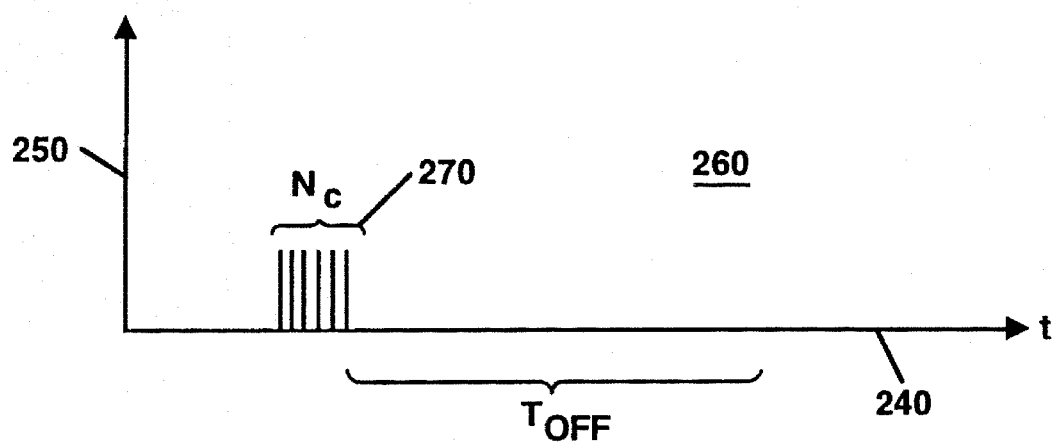
FIG. 3 is a timing diagram illustrating an example of timing of interrupt signals in prior art data processing systems.

The operation of the controller in FIG. 2 may be better understood by reference to FIG. 3, in which the horizontal axis 240 represents time and the vertical axis 250 denotes the occurrence or non-occurrence of interrupts. FIG. 3 depicts a set of interrupts 260, each interrupt occurrence being represented by a vertical line. Interrupts 260 together constitute a continuous sequence of vertical lines defined by bracket 270 (the number of which is denoted as Nc in FIG. 3). Such a sequence 260 of interrupts is deemed continuous whenever the interrupts occur consecutively so that each new interrupt occurs before the servicing of the preceding interrupt has been completed, as described above. If the sequence 260 of interrupts lasts a sufficiently long period of time, controller time is spent exclusively on servicing the interrupts 260, with no time allocation to perform other controller tasks.

Referring again to FIG. 2, if the continuous sequence 260 of interrupt signals illustrated in FIG. 3 is generated by event detector 50 and received by processor 70, these interrupts are processed in the following manner. When the respective processing of each interrupt is complete, the processor 70 compares the contents of interrupt counter 160 with a predetermined threshold value (THLD) residing in threshold register 180. As long as Nc, represented by the number in interrupt counter 160, is less than the threshold value THLD, controller 30 continues to process the interrupts. When the number of consecutive events Nc, as indicated by the contents of interrupt counter 160, becomes greater than the threshold value THLD, the interrupt service is disabled for a predetermined period of time, denoted as Toff in FIG. 3. This allows controller 30 to perform its other functions.

Figure 4:
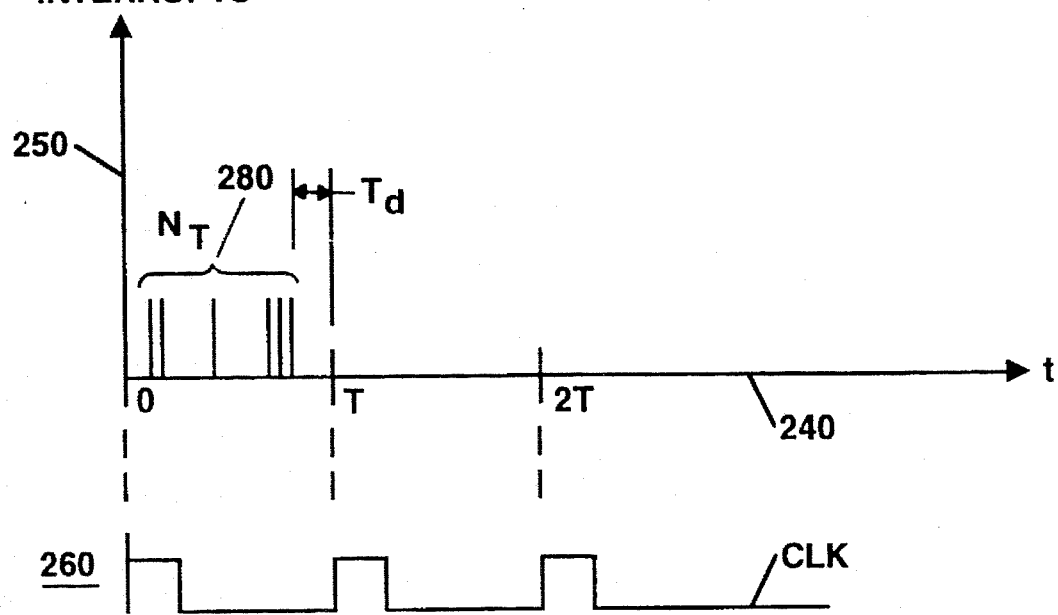
FIG. 4 is a timing diagram illustrating an example of timing of interrupt signals in a data processing system according to the invention.

A set of interrupts with somewhat different interrupt timing is shown in FIG. 4. In FIG. 4 the set of interrupts defined by bracket 280 (the number of which is denoted as Nt in FIG. 4) occur singly or in small groups with the number of consecutive interrupts never exceeding the threshold value THLD. Nevertheless, the interrupts occur with sufficient frequency to impose an unacceptably heavy demand on the controller resources. Under these conditions, controller 30 services an interrupt or a group of consecutive interrupts and then returns to its other tasks. However, after only a short time interval, controller 30 is interrupted again to service an interrupt. This substantial monopolization of the controller time by the interrupt service requests is alleviated by disabling the interrupts for the remainder (Td) of the time period T, if the number of interrupts exceeds a threshold value THLD. Because the interrupt remains disabled for the time period Td, controller 30 is allowed to process other tasks.

Figure 5:
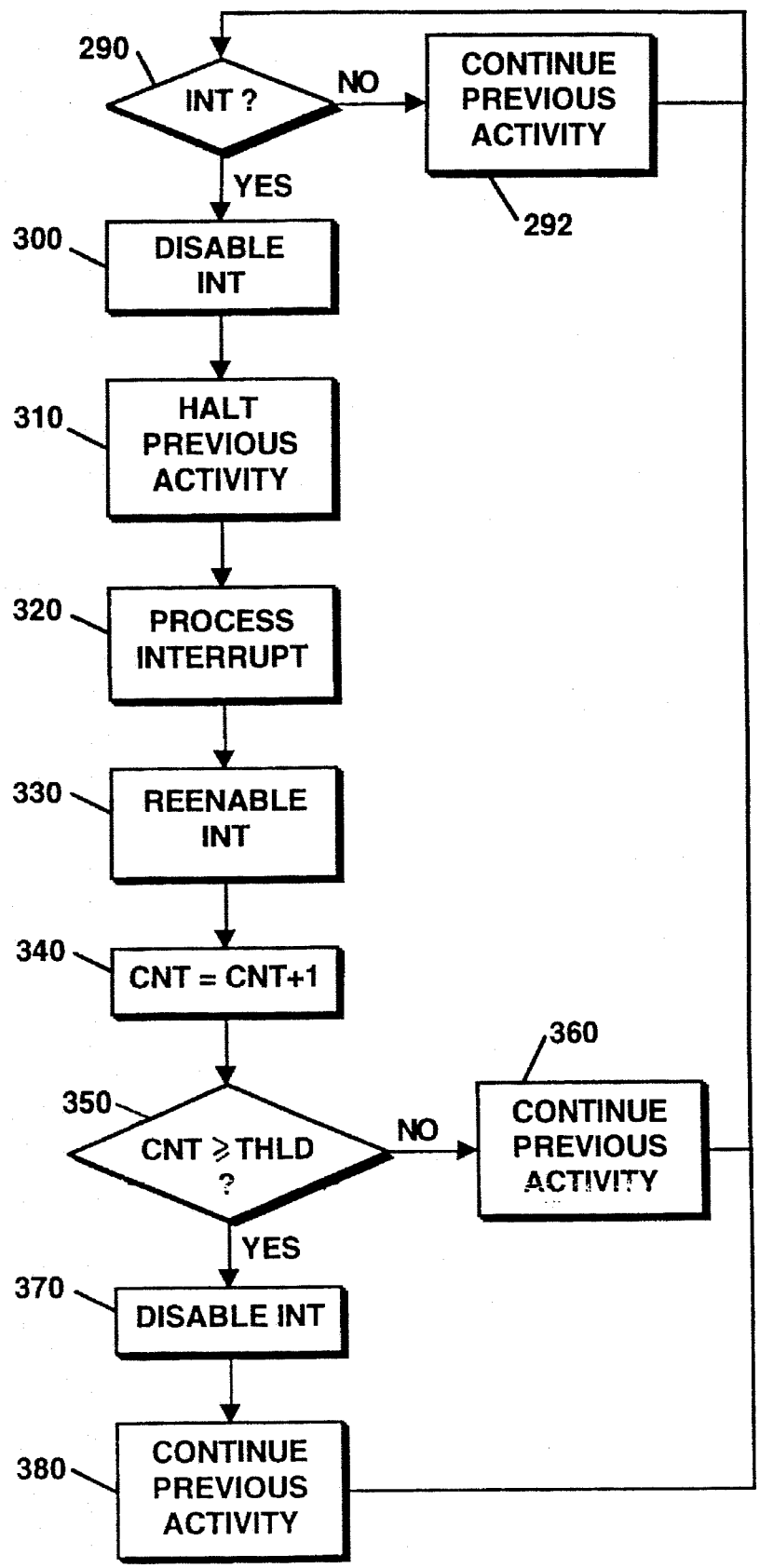
FIG. 5 is a flow chart illustrating the sequence of operations occurring within a time period illustrated in FIG. 4.

The procedure followed by processor 70 (of FIG. 2) in servicing interrupts follows the sequence of steps depicted in the flow chart of FIG. 5. At the beginning of each time period T of the clock signal CLK, the interrupt servicing is enabled. The processor begins at block 290 of FIG. 5. As long as no event occurs, no interrupt signal appears at interrupt port 60 of controller 30. The answer to the decision in block 290 is NO and controller 30 continues to perform its previous tasks as indicated by block 292. Once an event occurs, it is detected by event detector 50 which produces an interrupt signal INT at interrupt port 60. Since the interrupt is enabled, the decision in block 290 produces a Yes answer and an entry into block 300 is effected to disable the interrupt as described above. The previous activity of controller 30 is halted, as indicated in block 310, and the interrupt is serviced in the known manner in accordance with the interrupt routine contained in interrupt routine locations 130, as indicated by block 320. Thereafter, the interrupt is reenabled in block 330 and the number of interrupts occurring within time period T is counted by incrementing the value CNT, stored in interrupt counter 160, in block 340. The value CNT in interrupt counter 160 is then compared to a threshold value THLD, stored in threshold register 180, as shown in the decision block 350. If the value CNT in the interrupt counter 160 is less than the threshold value THLD in threshold register 180, the answer is No and controller 30 resumes its previous activity, as indicated in block 360, and is prepared to service future interrupts. If, on the other hand, the value CNT in interrupt counter 160 equals or exceeds the threshold value THLD in threshold register 180, the answer is YES and block 370 is entered instead and controller 30 disables interrupt servicing. At this point controller 30 resumes the activity it halted prior to servicing the last interrupt as indicated in block 380 but ignores future interrupts.

Referring again to FIG. 2, while processor 70 is processing interrupts as described above, the timer 200 continues to produce a periodic output signal CLK having a predetermined period T. The CLK signal is supplied to the clock input terminal CLK_IN of processor 70 via line 210. By detecting a rising edge in the clock signal CLK, processor 70 is able to determine the end of the previous time period T, and the beginning of each new time period T.

Figure 6:
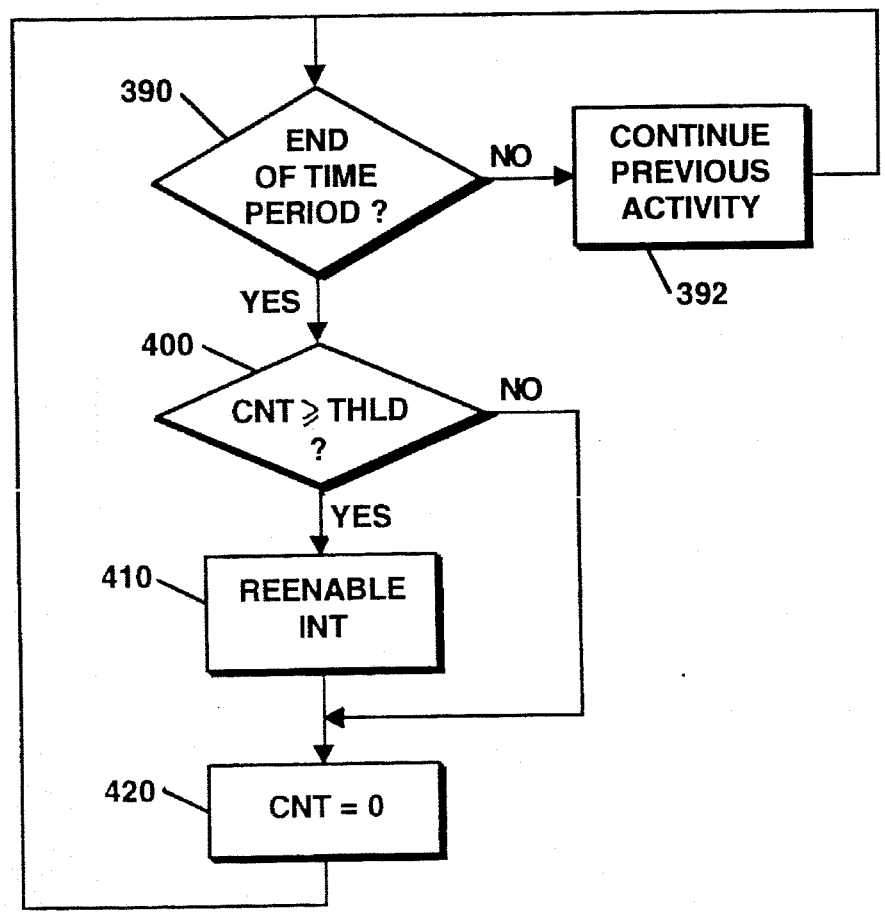
FIG. 6 is a flow chart illustrating the sequence of operations repeated upon expiration of the time period illustrated in FIG. 4.

The flow chart of FIG. 6 illustrates the procedure by which processor 70 processes the clock signal CLK. Processor 70 begins in block 390 where a decision is made whether the end of a period T of CLK signal has been reached. If the answer is No, controller 30 continues to function in its current mode of operation, as indicated by block 392. If, however, the end of the period T has been reached, the answer to the decision in block 390 is YES. Processor 70 next enters block 400 where it compares the current value CNT in interrupt counter 170 (of FIG. 2) to the threshold value THLD in threshold register 180. This comparison is performed in a manner analogous to the comparison indicated in block 350 of FIG. 5. If the number of events which occurred within the timer period T exceeded the threshold value THLD, the answer to the decision in block 400 is YES and the interrupt is enabled in block 410. If the comparison in block 400 produces an opposite answer, the interrupt service had not been previously disabled and the reenabling step of block 410 is bypassed. The value CNT in interrupt counter 160 is then reset to zero in block 420 and the process of FIG. 6 is resumed at block 390 for the next time period T.

Referring again to FIG. 2, the threshold value THLD and the time period T are the two interrupt service parameters whose selection is under control of a tuning logic 220. Processor 70 supplies data indicative of the time expended by processor 70 on interrupt processing, to tuning logic 220 via line 230. The tuning procedure utilizes the amount of time expended on interrupt processing and the contents of interrupt counter 160, and updates the contents of threshold register 180 and conditions timer 200 to update the time period T of CLK signal in order to adapt the nature of response of controller 30 to interrupt signals INT.

For example, controller 30 may require that more time be devoted to processing its other tasks. In that case, processor 70 may direct tuning logic 220 to reduce the threshold value THLD in threshold register 180. Alternatively, time period T may be extended at the expense of rapid interrupt servicing. A combination of these two options may also be implemented. Processor 70 can achieve this by requiring that tuning logic 220 extend the length of time period T of CLK signal. Consequently, a small value of THLD will result in interrupts caused by interrupt signals INT from event detector 50 being disabled after only a few occurrences.

On the other hand, controller 30 may require that interrupts be serviced on a more timely basis. In that case, processor 70 may direct tuning logic 220 to increase the threshold value THLD in threshold register 180. The larger threshold value THLD will cause the interrupts to be disabled only if occurrences of interrupt signals INT from event detector 50 are encountered at a relatively high rate. Time period T may also be tuned to assume a smaller value if the performance objective is to minimize the delay before processing the interrupts. This ability of tuning logic 220 to modify threshold value THLD in threshold register 180 and time interval T of CLK signal at the output of timer 200 is indicated by arrow 440 and arrow 450, respectively.

The flexibility of tuning the interrupt service parameters THLD and T advantageously permits data processing system 10 (of FIG. 1) to meet its performance goal with a smaller capacity, less expensive, controller 30 configured to process an average interrupt load. Therefore, the requirement of a faster and more costly controller needed to process the peak interrupt load is avoided.

The interrupt service procedure described in detail above may be extended in a straightforward manner to multiple event detectors which generate interrupts signals analogous to that from event detector 50 in FIG. 2. In this situation, each event detector is coupled to a different interrupt port of the controller. The circuitry and software elements required to service the interrupts caused by the different event detectors can be either replicated or shared for combined interrupt servicing. For example, each interrupt may require that a different interrupt service routine be executed. In addition to the interrupt level assignment depending upon the desired priority level of responding to each event, each interrupt service can be further adjusted by selecting the appropriate parameters THLD and T individually.

The foregoing description of the preferred embodiment is offered solely by way of illustration of the underlying principles of the invention. Many changes, modifications, and variations apparent to those skilled in the art may suggest themselves and are to be taken as embraced within the spirit and the scope of the appended claims.

We claim:

1. In a data processing system, apparatus for adaptively servicing interrupts, comprising:

a timer, coupled to a processor, for generating a clock signal having a predetermined time period;

a tuning logic coupled to an input terminal of said timer and to the input terminal of a threshold register, said tuning logic responsive to the processor, said tuning logic for changing said predetermined threshold value stored in said threshold register in response to data from the processor;

means for counting interrupts from a plurality of ancillary devices occurring within the predetermined time period while interrupt servicing is enabled, said counting resulting in a number value;

means for comparing said number value to a predetermined threshold value; and means for disabling interrupts servicing if said number value equals or exceeds said threshold value.

2. The apparatus of claim 1 further comprising the means for adjusting said predetermined time period in response to a signal from a processor in the data processing system.

3. The apparatus of claim 1 further comprising the means for adjusting said threshold value in response to signals from a processor in the data processing system.

4. A data processing system, including a plurality of sources of interrupt signals and a processor receiving and processing the interrupt signals, comprising:

an interrupt counter, coupled to the processor, for counting the interrupt signals;

a threshold register, coupled to the processor, for storing a predetermined threshold value;

means, responsive to the processor, for selectively disabling interrupt processing by the processor if the number of interrupt signals counted by said interrupt counter equals or exceeds said predetermined threshold value;

a timer, coupled to the processor, for generating a clock signal having a predetermined time period; and a tuning logic coupled to an input terminal of said timer and to the input terminal of said threshold register, said tuning logic responsive to the processor, said tuning logic for changing said predetermined threshold value stored in said threshold register in response to data from the processor.

* * * * *